United States Patent Office 3,590,112
Patented June 29, 1971

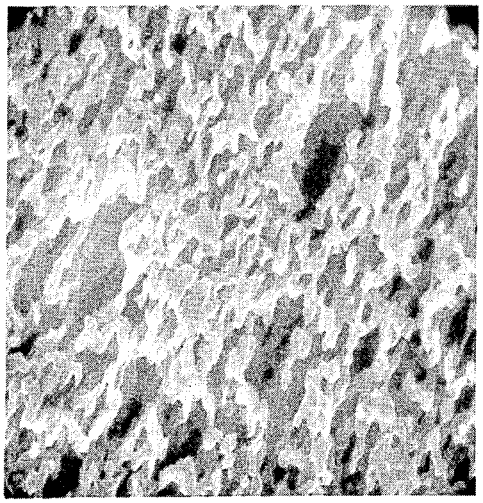
FIG.1 ←100μ→
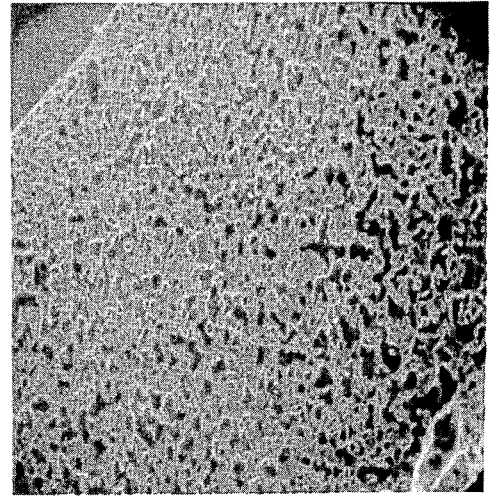
FIG.2 ←100μ→
FIG.3 ←10μ→
FIG.4 ←10μ→

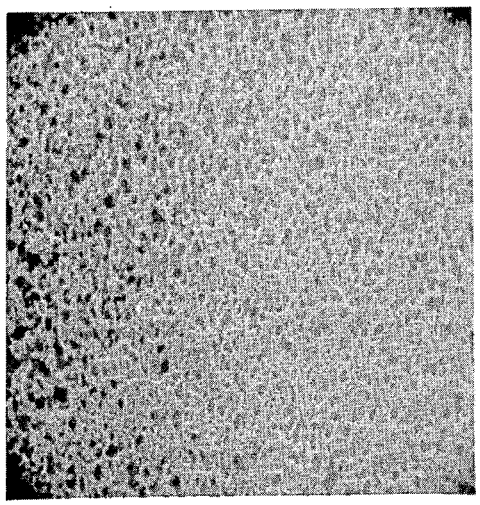
FIG. 5   ←100μ→
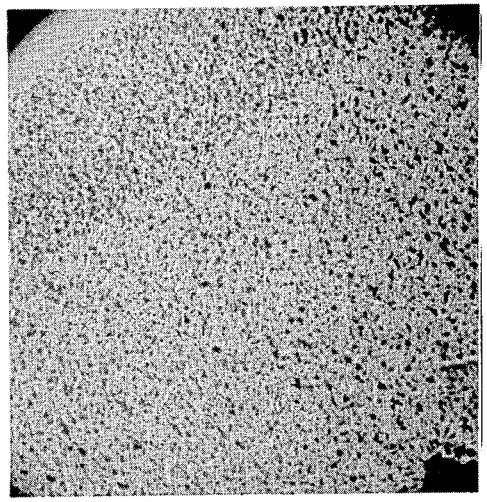
FIG. 6   ←200μ→
FIG. 7
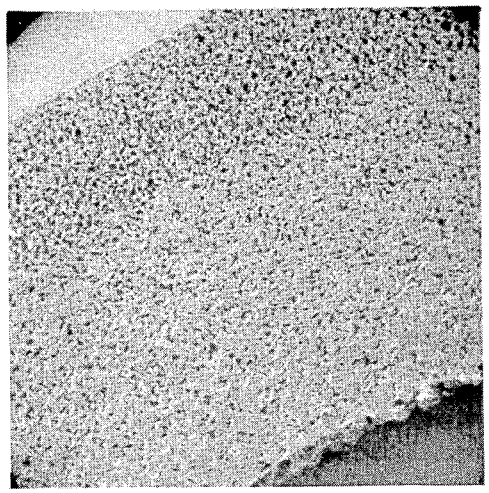
←200μ→

3,590,112
TREATMENT OF MICROPOROUS ELASTOMERIC POLYURETHANE
Frank P. Civardi, Wayne, N.J., assignor to Inmont Corporation, New York, N.Y.
Filed Dec. 2, 1968, Ser. No. 780,477
Int. Cl. B29c 25/00; B29d 27/00
U.S. Cl. 264—321                                   6 Claims

ABSTRACT OF THE DISCLOSURE

Process for improving the properties of water vapor permeable microporous sheet of non-fibrous thermoplastic elastomeric polyurethane of thickness suitable for use as a substitute for shoe upper leather. The sheet is heat treated at a temperature below its collapse temperature so that it shrinks at least 5% in area.

---

Microporous leather substitutes, comprising a fibrous base such as a relatively thick woven or non-woven fabric impregnated with, and coated with a much thinner layer of microporous polymer such as a polyurethane, are well known in the art and sheets of such products have been used extensively for replacements for leather in men's (and women's) shoe uppers. For men's shoe uppers the suitable thickness of the sheet material is about 60–70 mils (about 1.5–1.8 mm.) while for women's shoe uppers the suitable thickness is about 30–45 mils (about .8–1.1 mm.); most of this thickness, in each case, is occupied by the fibrous fabric and the microporous polyurethane layer above the fabric is relatively thin (e.g. about 0.25–0.4 mm. in thickness).

The present invention relates to the treatment of a different type of microporous material and is useful for making improved shoe upper materials, as well as other articles. The microporous sheet material used in the practice of this invention does not have its extensibility constrained by the presence of a reinforcing fabric such as a woven or non-woven fibrous fabric. Throughout its thickness it consists essentially of non-fibrous elastomeric polyurethane material. Unlike the conventional leather substitutes which have ultimate elongations of some 20–40%, it can be stretched well over 50% (e.g. well over 100% and usually well over 200%).

In accordance with one aspect of this invention this microporous flexible unreinforced sheet, having a thickness of at least 25 mils (0.63 mm.), e.g. about 30 to 100 mils (about 0.75 to 2.5 mm.) and preferably about 30 to 70 mils (about 0.76 to 1.8 mm.), is given a heat treatment so as to cause the sheet to shrink in area in the plane of the sheet. This heat treatment has been found to improve the properties of the sheet significantly, as by increasing its flex life or by improving its tear strength and other merchancial properties. By the use of the heat treatment it is also possible to even out the properties of successive areas, or successive sheets, produced in plant operations in which its is difficult to maintain strict control of the conditions for making the microporous product. Thus, by such heat treatment, sheets which do not have all the properties required by manufacturing specifications and which might therefore be scrapped or sold as "seconds" can be improved to make them equal to first quality material. This, of course, is of great importance in commercial operations. Furthermore the use of the process makes it possible to produce an initial microporous product of lower density than is desired in the final material and to convert it to a more dense microporous product of good properties having good water vapor transmission. Other advantages will be apparent from a consideration of the information given hereafter in this specification.

The invention is most useful in making substitutes for shoe upper leather. In the manufacture of shoes, it is customary to cut the upper leather, usually with a die by machine, and to fit and assemble the parts of the upper together (including any doubler or lining that is to be used) as by stitching and/or cementing so as to ready the upper for lasting. After the insole has been secured to the bottom of the last, the upper is placed on the last, pulled over the wooden last so as to conform tightly to it, and attached to the insole. This "pulling over" is generally effected by mechanisms which grip, and pull, the upper at its edges, e.g. at the toe and sides.

During the fitting together of the upper, the edges of the upper leather are generally "skived," by cutting a bevel on the "flesh side" of the leather adjacent its edge and the skived edge is then cemented, folded back on itself and pressed in place, to give a neat finished top line or other edge.

Descriptions of the conventional methods for making shoes are contained in the 61 page publication "How American Shoes Are Made," 3rd edition, copyright 1966 by United Shoe Machinery Corporation.

Excellent shoes have been made with materials produced in accordance with this invention in place of the usual upper leather. The upper not only conforms unusually well to the last, without wrinkling or puckering, but also retains its lasted shape very well after removal from the last, particularly when the upper has been given the conventional type of heat setting treatment (e.g. setting with heat alone or moist heat) on the last. The material has very good skiving characteristics, particularly if it is wet with water prior to skiving. The shoes are comfortable and the uppers show very good wear resistance. Unlike many shoes made with the conventional fabric-reinforced leather substitutes, there is no problem of fabric show-through or orange peel on lasting.

The "microporous" materials used in the process of this invention have pores invisible to the naked eye of a person with 20/20 vision. Such pores measure less than 100 microns in their maximum dimension (when a plane surface, such as the top or bottom of the material or a cross-section thereof is observed). As will be seen hereafter, the pores generally measure well below 50 microns in their maximum dimension.

The accompanying drawings show photomicrographs of various microporous materials used, or produced, in the practice of this invention. These photomicrographs were obtained with a scanning type electron microscope (Type JSM, Japan Electron Optics Laboratory Co., Ltd.), viewing cross-sections of the sheet material (obtained by cutting through the thickness of the sheet with a razor). In preparation for viewing the cut sheet material is given a very thin uniform metallic (gold-palladium) coating about 300 angstroms in thickness; the coating may be applied by evaporating the metal onto the specimen in a high vacuum (e.g. $10^{-4}$ mm. Hg), the specimen being rocked while metal deposition is occurring, so as to distribute the metal uniformly over the surface, including the crevices, of the specimen. This coating serves to conduct away the electron charge which would otherwise accumulate on the surface of the specimen when it is exposed to the electron beam in the scanning electron microscope. The approximate scale is indicated for each photomicrograph. In viewing the photomicrographs it should be borne in mind that the scanning type electron microscope has a great depth of focus (nearly 300 times that of the light microscope) such as about 300 microns at 100× magnification or 100 microns at 1000× magnification, enabling one to, in effect, see into the interiors of the pores.

The invention has thus far found its greatest utility in the treatment of a microporous sheet having a structure as illustrated in FIGS. 2 to 5 in which the pore system comprises cavities 12 (FIG. 3) having their maximum dimensions in the range of up to about 45 microns connected by passages 13 which may have much smaller dimensions (e.g. maximum dimensions apparently as low as about ½ micron). The walls of the cavities may be very thin, such as the wall seen between the two cavities at the upper right of FIG. 4; it will be understood that other walls present in FIG. 4 are seen broadside, or at an angle, so that their thinness is not readily apparent. The thickness of the walls appears to be on the order of 1 to 10 microns. Fine cavities 14 may also be present in the walls of the irregular cavities 12. One suitable method for making such a structure is by forming, as on a temporary support, a thick layer of a mixture of a leachable material (such as microscopic sodium chloride particles) and a solution of the thermoplastic polyurethane in a solvent (e.g. dimethylformamide) and treating the layer on the support with a liquid coagulant-leaching agent (e.g. water) which is a non-solvent for the polyurethane and at least partially miscible with the solvent, so as to coagulate the polyurethane into a microporous sheet; the treatment with the coagulant is continued until substantially all the solvent and leachable material are removed; the resulting water vapor-permeable flexible sheet material is dried and stripped from the temporary support.

Another type of microporous sheet which may be treated in accordance with this invention has a structure as illustrated in FIG. 1 in which the pore system is substantially free of the larger cavities 12 seen in FIG. 3, but instead includes a multitude of fine interconnected pores of considerably smaller size. One technique for making such a product uses a mixture comprising the thermoplastic elastomeric polyurethane uniformly distributed in a blend of a volatile solvent and a miscible less volatile nonsolvent. In a preferred version of this technique a clear hot solution of the polyurethane in the solvent-nonsolvent blend is cooled until a cloudy colloidal dispersion of the polyurethane is formed; this cloudy dispersion is cast as a thick layer onto the temporary support and the solvent and non-solvent are evaporated, and the sheet is removed from the support.

Microporous sheets which may be treated in accordance with the present invention may be made by other techniques. Thus, other coagulating methods may be used to treat the thick layer of the mixture of polyurethane solution and leachable material. Among such coagulating methods are cooling the mixture, (e.g. $-78°$ C.), or subjecting the mixture to vapors of non-solvent (e.g. to a humid atmosphere), or simply evaporating the solvent, preferably at a rate slow enough to avoid the formation of macroporous bubbles or holes in the sheet, or using various combinations of these coagulating methods (e.g. freeze drying techniques) before removal of the leachable material (e.g. NaCl) or other microscopic particulate material. In place of, or together with, the salt particles, other pore-forming microscopic particulate material may be used. These particulate materials may be starch particles (which may be removed by treating the coagulated layer with an aqueous starch-digesting agent, such as an enzyme, of known type). Or they may be other microscopic solid particles which are insoluble in the polyurethane solution and which can either be dissolved out by treating the coagulated sheet with water or other suitable solvent for the particle which is a non-solvent for the polyurethane or can be otherwise destroyed or removed; examples of such particles are sodium carbonate, oxalic acid, ammonium carbonate, or suitable microballoons. Alternatively, the void-forming particulate material may be in the form of dispersed microscopic droplets of a liquid insoluble in the solution of polyurethane or in the form of dispersed microscopic bubbles of gas. The particle size of the microscopic particulate material is well below 100 microns, preferably less than 50 microns and greater than about one micron, more preferably in the range of about 3 to 20 microns. The ratio of the total volume of the microscopic particulate void forming material and the total volume of polyurethane in solution may be, for instance, in the range of about 0.5:1 to 5:1, preferably in the range of about 1:1 to 3:1, thus 178 grams of the sodium chloride particles may be mixed with 333 grams of a 30% solution of the polyurethane in dimethylformamide, giving a volumetric salt:polymer ratio of 1:1.

The heat treatment of this invention may be carried out before or after the microporous material is subjected to one or more finishing operations. One very suitable finishing operation is a treatment of the upper surface with fine droplets of a solvent and heating, in a manner to partially collapse the microporous structure along the surface and form a thin fused polyurethane skin thereon; materials so finished often have a series of tiny spaced depressions, lined with fused polyurethane material (e.g. about 2 to 15 micron in thickness), at said surface. Another suitable finishing treatment involves applying to the upper surface of the microporous material a thin top coat, such as an aqueous emulsion of a suitable polymer (e.g. an alkyl acrylate polymer or copolymer such as a copolymer of butylacrylate with some 15% of acrylonitrile and about 1-2% of itaconic acid, which can be cross-linked on heating by the inclusion of ureaformaldehyde condensation product in the emulsion, as is well known in the art); the amount of such polymer may be insufficient to close the pores, or sufficient to provide a very thin layer, less than about one micron in thickness, whereby the appearance of the material is improved without unduly decreasing its ability to transmit water vapor. The topcoat may be a continuous layer which imparts a glossy "patent" finish to the material; thus one may apply a conventional organic solvent solution of polyvinyl butyral mixed with solvent-soluble melamine-formaldehyde resin, and evaporate off the solvent and cure (cross-link) the mixture of these two resins. Still another suitable finishing treatment is a dyeing of the material with a solution of a solvent dye (such as an "Irgacet" dye, which may be of the type described in U.S. Patent 2,551,056, dissolved in methanol); in one preferred form of the invention such dyeing precedes the treatment with solvent spray or the application of the topcoat, or both. The heat treatment of this invention preferably immediately follows the step of evaporating off any volatile material used in the finishing treatments.

The heat treatment of this invention is effected while the unreinforced microporous polyurethane sheet is free to shrink in its planar direction. The time (duration) and temperature of the treatment will depend on the particular polyurethane composition; thus it should not be so high as to melt the material or cause a collapse of its pores. The time and temperature of treatment should, however, be high enough to cause an area shrinkage of above about 5%, e.g. in the range of about 5 to 40%. For a sheet material having a structure of the type shown in FIGS. 2–5, previously discussed, a shrinkage of about 10–20% in area has given best results. For a sheet material having a structure of the type shown in FIG. 1, and particularly a sheet material in which the pores just below the surface are larger, on the average, than the pores of the main body of the sheet, a shrinkage of about 20–40% in area has given best results. The temperature of the heat treatment is preferably at least 2° C. less than the collapse temperature of hte microporous material (that is the temperature at which the sheet loses its porous structure, a phenomenon which is evidenced by the dry sheet becoming translucent or transparent), well within 40° C. of the collapse temperature and usually within 30° C. and often well within 15° C. of it (e.g. 5–15° C. less than the collapse temperature). The duration of the heat treatment is preferably relatively short, well below an hour, and usually well below 15 minutes. The optimum temperature and duration of treatment can be determined by simple experimentation and will of course depend in part on the efficiency at which the heat is transferred to and through the surface zones of the microporous material (which is itself a heat-insulating structure). Generally in a convection oven the duration is over a minute, e.g. about 3 to 5 minutes. The measurements of temperature in a convection oven are conveniently made by placing a thermocouple in the air very close to (i.e. just above) the upper surface of the sheet material.

In one particularly preferred process, little if any change in the thickness of the material is observed during the heat treatment. In another embodiment, which is especially suitable when the microporous structure, prior to heat treatment, is of lower density (e.g. about 0.2–0.3 g./cm.³) the treatment is such as to cause substantial decrease in thickness and consequent greater densification, e.g. to provide a material having a density above 0.35 g./cm.³ (such as 0.35 to 0.5). A treatment under conditions to reduce thickness may also be employed to make acceptable for certain uses an otherwise unacceptable sheet; for instance a material 1.1 mm. in thickness, which is too thick for use in place of the upper leather in ladies' lined shoes (although acceptable for other uses) may be heat treated to reduce its thickness to an acceptable 0.8 mm. Preferably the sheets are substantially free of visible pores (macropores) both before and after the heat treatment.

Unexpectedly, different properties of the microporous sheet are affected by variations in the heat treatment conditions. For example, a heat treatment at moderate conditions (e.g. at some 10–20° C. below the collapse temperature, for 10 minutes) has given some increase in density without change in thickness, a significant increase in flex life without increasing the tear strength or lowering the water vapor transmission of the sheet. When more severe conditions were used (e.g. at 5° C. below the collapse temperature for 10 minutes) there was a very substantial increase in density and tear strength while the sheet continued to have a high water vapor transmission. FIGS. 6 and 7 are cross-sections of products produced by different heat treatments of the same starting material, a sheet material having a more dense base layer and a less dense upper layer. In each of these photomicrographs the lower surface of the sheet runs diagonally at the lower right hand corner of the picture while the upper surface runs diagonally at the upper left hand corner of the picture (the white band is background and should be disregarded). FIG. 6 is a product of moderate heat treatment. FIG. 7 is a product of more drastic heat treatment with consequent substantial reduction in thickness.

The properties of the treated material are generally substantially the same both widthwise and lengthwise; it is unlike leather and certain synthetic leathers whose orientation in one direction limits the way in which pieces can be cut from the sheet during the manufacture of shoes or other products, and it therefore permits the cutter to make use of much more of the area of the sheet.

The heat treatment is conveniently carried out in a stream of hot air, e.g. in suitable convection oven, while the sheet material is supported horizontally on a support which permits the desired planar shrinkage, such as a grate or a series of closely spaced rollers or an endless canvas belt. When the material being treated is in the form of a continuous sheet, little if any lengthwise tension is applied in order to move the material through the oven. The sheet material may, less desirably, be hung vertically, particularly when the width of the material is not great and the force of gravity resisting shrinkage is therefore small.

Instead of heating by convection from a hot gas, the heat may be supplied by radiation (e.g. by infrared heaters or by dielectric heaters, such as those operating at radio frequencies) or by conduction, as by passing the material over hot rolls (e.g. conventional hot "cans") or through a hot liquid medium, in such a way that the planer shrinkage occurs.

The solid polymeric material of the microporous sheets treated in accordance with this invention is a thermoplastic elastomeric polyurethane material having an intrinsic viscosity of above 0.6, preferably above 0.8, and more preferably about 1 or more. The polyurethane is composed of segments having urethane linkages and intermediate longer segments which may for example be of polyester or polyether character. The urethane linkages are preferably derived from aromatic diisocyanates, such as diphenyl methane-p,p'-diisocyanate, and are thought to provide so called "hard" segments in the polymer molecule, while the other segments (e.g. the polyester or polyether segments) are flexible or "soft." Polyurethanes of this type are known in the art. They may be made, for instance, by reacting a relatively low molecular weight hydroxyl-terminated polyester or polyether (e.g. of molecular weight below 6000 and preferably between 800 and 2500) with a low molecular weight glycol and a diisocyanate.

In making the polyurethane one may employ a polyester of a hydroxycarboxylic acid (e.g. a polycaprolactone) or a polyester of a glycol and a dicarboxylic acid (e.g. ethylene glycol adipate or 1,4-butanediol adipate) or a mixed polyester of these types of components. Examples of other dicarboxylic acids which may be used instead of, or in addition to, adipic acid, are succinic, pimelic, suberic, azelaic or sebacic acids or aromatic acids such as phthalic acid or terephthalic acid. Examples of other glycols which may be used to make the polyester and 1,6-hexanediol and 1,8-octanediol. The most useful polyesters are aliphatic polyesters in which the

groups are separated by aliphatic chains averaging about 3 to 6 carbon atoms in length.

Typical polyethers which are used to provide the soft segments for elastomeric polyurethanes are usually of aliphatic character. One type has the formula $H(RO)_nH$ where R is a divalent alkylene radical, such as tetramethylene or ethylene or propylene, an $n$ denotes the degree of polymerization.

The preferred diisocyanate is diphenyl methane-p,p'-diisocyanate, but other diisocyanates may be used as such or in admixture therewith. Examples of other diisocyanates are 2,4-toluene diisocyanate, p,p'-diphenyl diisocyanate and tetramethylene diisocyanate.

The low molecular weight glycol referred to above acts as a chain extender. The preferred chain extender is tetramethylene glycol, but other chain extenders may be used as such or in admixture therewith. Examples of such other difunctional chain extenders are other dihydric alcohols such as ethylene glycol, hydroxy amines such as 2-aminoethanol, diamines such as ethylene diamine, or water. The amount of chain extender is preferably such as to produce a thermoplastic product of high intrinsic viscosity.

In the preferred class of polyester polyurethanes made with diphenylmethane-p,p'-diisocyanate, those having nitrogen contents in the range of 4 to 5%, most preferably in the neighborhood of 4½% (e.g. 4.4–4.6%), have been found to be particularly suitable.

The polyurethane material should have a melting point of at least 100° C. preferably above 150° C. (e.g. about 170 to 200° C. as measured by differential thermal analysis or differential scanning calorimetry). When formed into a smooth void-free thin film 0.2–0.4 mm. in thickness it should have the properties described below; such thin films can be formed by careful casting of solutions of the polymer (e.g. a degassed 30% solution in dimethylformamide) followed by careful evaporation of the solvent in a dry atmosphere: a tensile strength of at least 210 kilograms per square centimeter (preferably at least 350, e.g. about 420 to 560), a percent elongation at break of at least 300% (preferably at least 400%, e.g. about 500 to 700%), an elastic modulus of at least 105 kilograms per square centimeter (preferably at least 350 e.g. about 560 to 770), a 100% secant modulus (stress divided by strain at 100% elongation) of at least 28 kilograms per square centimeter (preferably at least 84, e.g. about 110 to 134). These mechanical properties are measured by ASTM D882–67.

The polyurethane (again, tested as a thin film made as described above) should recover completely from a 5% elongation at room temperature (23° C.) but preferably does take on a permanent set (one measured for example as in a ASTM D412–66) after a 100% elongation. This set is usually within the range of about 5 to 20%; for the best materials thus far employed it is in the range of about 10 to 20%, e.g. about 15%. A typical material shows a tension set of some 24–26% immediately on release of the clamps after being held at the 100% elongation for 10 minutes while the "permanent set," which is here taken as the tension set measured 1 hour after the release of the clamps, is 14% (measured on a film specimen 1 cm. wide with a gage length of 5 cm. and a strain rate, for the 100% elongation, of 254% per minute). Preferably the material has a Shore hardness of at least 75A (more preferably about 90A to 60D), measured by ASTM D1706–67.

The polyurethane material may be composed of polyurethane per se. It is also within the broad scope of the invention to use polyurethane materials which are blends of polyurethanes and other high polymers such as a vinyl chloride polymer (e.g. the vinyl chloride copolymers known as Bakelite VYHH or VAGH, containing vinyl acetate as a comonomer) or a rubbery copolymer of a conjugated diolefin and acrylonitrile (e.g. the butadiene-acrylonitrile copolymer known as Hycar 1031). The amount of such other high polymer is generally below 40% (e.g. 10% or 20%) of the total weight of the blend.

The heat-treated microporous sheet obtained in accordance with this invention preferably has an apparent density in the range of about 0.35 to 0.7, and more preferably in the range of about 0.35 to 0.5 grams/cm.$^3$. The specific degree of shrinkage occurring during heat treatment depends in part on the structure of the material and its previous history. The apparent density of the microporous sheet before heat treatment is preferably below about 0.5 e.g. in the range of about 0.25 to 0.45 gram/cm.$^3$. Typically the density of the polyurethane itself is about 1.2; it will therefore be apparent that in the neighborhood of ¼ to ½ of the volume of the microporous material is air.

The heat-treated microporous sheet obtained in accordance with this invention preferably has a percent elongation at break of above 50% (e.g. in the range of about 300 to 400% or more); a tensile strength above 35 kg./cm.$^2$ (e.g. in the range of about 60 to 100); an elastic modulus above 2 kg./cm.$^2$ (e.g. in the range of about 4 to 9), and a slit tear strength (ASTM D2212–64) above 1 kg. per mm. thickness (e.g. in the range of about 2 to 5). As will be seen in the examples below, the use of the heat treatment of this invention has effected considerable improvements in the physical properties of the sheet material, making it possible to obtain good products from weaker or less perfect microporous sheets, while retaining their ability to transmit moisture vapor. Desirably the microporous sheet, before heat treatment, should have a percent elongation at break above 50%, more preferably 70% or higher and a tensile strength of at least 5 kg./cm.$^2$. Both before and after the heat treatment it should permit the passage of water vapor (thus its water vapor transmission should be at least 200 g./m.$^2$/24 hrs. measured as in ASTM E 96–66, procedure B). Also, it is desirable that at least the upper surface of the sheet, after suitable finishing, be resistant to the passage of liquid water, e.g. the finished sheet should have a hydrostatic head (British Standard 2823) of above 100 mm. Hg.

The following examples are given to illustrate this invention more fully. In the examples all pressures are atmospheric unless otherwise indicated. In the application all proportions are by weight unless otherwise indicated.

EXAMPLE 1

The sheet material which is heat-treated in this example is a unitary sheet consisting of microporous thermoplastic elastomeric pigmented polyurethane in two parallel zones (hereafter called "layers"), one above the other. The base layer has a thickness of about 1.2 mm. and weighs 590 grams/m.$^2$ (accordingly its density is about 0.48 g./cm.$^3$); it is covered by an upper layer about 0.5 mm. thick. The overall density of the material is 0.42 g./cm.$^3$.

The thermoplastic elastomeric polyurethane is made from hydroxyl-terminated ethylene glycol adipate polyester of about 2000 molecular weight, 1,4-butanediol and 4,4 - diphenylmethane diisocyanate. Two homogeneous pigmented pastes containing finely ground sodium chloride dispersed in a solution of the polyurethane in N,N-dimethylformamide ("DMF") are prepared. In one paste (which is used for the base layer and is hereafter termed the "substrate paste") the weight ratio of NaCl to polyurethane is 1.78:1. In the other paste (which is used for the upper layer and is hereafter termed the "upper layer paste") that weight ratio is 3:1.

To make the pastes a 30% solution of the polyurethane (of intrinsic viscosity 0.77, measured in DMF) in DMF. A pigment masterbatch is made by mixing 40 kg. of the polyurethane solution with 8 kg. carbon black ("Rajah black") and milling.

The substrate paste comprises 48.4 kg. of the 30% polyurethane solution, 750 g. of the masterbatch, 1.6 kg. of DMF and 26.7 kg. of micropulverized sodium chloride (13 micron average particle diameter) while the upper layer paste comprises 37.3 kg. of the 30% polyurethane solutions 8.9 kg. of DMF, 6.25 kg. of the masterbatch and 37.5 kg. of the same micropulverized salt.

The substrate paste is cast onto a porous temporary support under a doctor blade and the upper layer paste is then cast directly on the first cast paste under a second, higher, doctor blade. The support is then passed through a water bath (e.g. at 20° C. for a period of 3 hours or more) to thoroughly coagulate the two layers and then through mangles in a series of leaching tanks in hotter water (e.g. at 60° C. for several hours) to leach out the sodium chloride, after which it is thoroughly dried in an oven supplied with heated air at a temperature of, for example, 120° C. The dried sheet, stripped from its temporary support, has a cross-section like that shown in FIG. 5 which is a cross-sectional view showing the portion of the sheet at and near the zone joining the two layers; this zone (which is parallel to the sheet's upper and lower surfaces, not shown in the photograph) appears in the photograph as running diagonally at about a 45° angle from the lower left to the upper right of FIG. 5. The surface of the sheet which was in contact with the porous, somewhat rough, temporary support and which was stripped therefrom has a relatively rough, somewhat fibrous appearance and feel.

The dried sheet is then finished by treating its upper surface with a fine spray of droplets of dimethylformamide, which droplets contact the surface at spaced minute zones, and is very shortly thereafter (in a matter of seconds) treated with hot air (supplied, e.g. at 100° C.) which acts to fuse the solvent-rich polymer at the surface and to evaporate the solvent rapidly, giving a product whose porous structure is collapsed at the surface and which has numerous spaced minute shallow depressions lined with a skin of fused polyurethane. This treatment darkens the surface, increases its resistance to ingress of liquid water, and produces a surface finish approximating the hair cell pattern of natural calf leather.

A dried self-sustaining sheet made in the manner described above is then heat treated by keeping it for 3 minutes in a forced air oven in which dry air maintained at a temperature of 168° C. is blown across it at a velocity of about 200 feet per minute. The sheet rests on an open grate in the oven. During the treatment the material shrinks in both the longitudinal and lateral directions, the shrinkage in area being 5–8%. The thickness does not change substantially. While the flex life of the material (as shown by the formation of outfold cracks during cold flex testing according to ASTM D2097–62T on a Newark Leather Finish Co. flex testing machine operated in an atmophere at 0° C.) is less than 13.5 hours for the material which has not been heat-treated, the heat-treated material withstands well over 25 hours (the test being discontinued thereafter because of edge tear possibly caused by improper clamping in the test). This improvement in flex life is attained without lowering the water vapor transmission of the sheet; unexpectedly the water vapor transmission (ASTM E96–66 Procedure B) actually increases from 420 g./m.$^2$/24 hr. before heat treatment to 480 g./m.$^2$/24 hr. after heat treatment. The slit tear strength (ASTM D2212–64) is unchanged. The collapse temperature of the starting material is 192° C., measured in the same oven.

EXAMPLE 2

Example 1 is repeated except that instead of finishing the sheet by spraying its surface with dimethylformamide a very thin discontinuous topcoat of an emulsion of a polyacrylate ester (Earnshaws Ltd. "Encryl FW") is applied so as to deposit about 10 gms./m.$^2$ of the polyacrylate thereon.

The sheet is then heat treated as in Example 1. After 34 hours no outfold cracks are visible (in the same flex test as described in Example 1) and the test is discontinued. In contrast severe outfold cracks develop before 18.5 hours of the same material which has not been given the heat treatment. This improvement in flex life is attained without lowering the water vapor transmission of the sheet, which is well over 540 g./m.$^2$/24 hrs. (measured as in Example 1).

EXAMPLE 3

The sheet treated in this example is an unfinished single layer microporous material having an apparent density of 0.40 g./cm.$^3$ and a thickness of 1.9 mm. Its porous structure is like that shown in FIGS. 3 and 4.

The sheet is prepared from a thermoplastic elastomeric polyurethane, made as follows:

To 20.7 kg. of N,N-dimethylformamide ("DMF") in a 10 gal. reactor are added 4423.8 g. Desmophen 2001 polyester (a hydroxyl-terminated polyester of 2000 molecular weight made from 1 mol butane diol-1,4, 1.13 mol ethylene glycol and 2 mols adipic acid), 900.61 g. 1,4-butanediol, 0.5148 g. methanol, 2.154 g. trimethylolpropane (the amounts of monofunctional methanol and trifunctional trimethylolpropane being such as to give an average functionality of two), 0.04127 g. p-toluenesulfonic acid, 3.536 g. dibutyl tin dilaurate and 3514.42 g. diphenylmethane-p,p' diisocyanate. The solution is stirred at 120° F. for 2½ hours, the unreacted isocyanate content determined by titration, then an amount 1,4-butanediol to provide one alcoholic hydroxyl for each unreacted isocyanate group is added. The viscosity of the solution increases over a 6 hour period to 1450 poise (Brookfield), at which point 160 g. of a 40/60 methanol/DMF solution is added to stop the reaction. The final solution viscosity is 2100 poise; the final intrinsic viscosity is 1.115.

Into 427 g. of micropulverized sodium chloride (average particle size 10 microns, maximum particle size 52 microns) contained in a one gallon, two-arm kneader is mixed 800 g. of the above polyurethane solution. After being mixed for 65 minutes, the mixture is degassed at 4 mm. Hg for about 30 minutes, spread between 3.25 mm. shims onto a porous temporary support (a sintered polyethylene sheet treated with "Duponol ME" surfactant), immersed in 20° C. water for one hour, then overnight in 57° C. water, dried and removed from the temporary support.

The material is heated in a convection oven, as in Example 1, at various temperatures below its collapse temperature (which was 180° C.), with the following results:

|  | | Heat treatment conditions | |
| --- | --- | --- | --- |
|  | None | 168° C. for 10 minutes | 174° C. for 10 minutes |
| Thickness (mm.) | 1.9 | 1.95 | 1.4 |
| Shrinkage (percent change): | | | |
| Lengthwise | | −7 | −6 |
| Widthwise | | −6 | −6 |
| Apparent density (g./cm.$^3$) | 0.40 | 0.52 | 0.68 |
| Water vapor transmission (g./m.$^2$/24 hrs.) | 720 | 670 | 750 |
| Slit tear strength (kg.) | 3.40 | 3.75 | 4.20 |
| Flex life at −12° C. (hours) | 24 | 48 | 15 |

The heat-treated microporous product is soluble in dimethylformamide and any scrap of the heat-treated product may be mixed with freshly produced polyurethane and the dimethylformamide solvent and recycled to the process; thus, the scrap may be used to make more of the solution which is cast onto the temporary support. In such recycling the ratio of recycled polyurethane to fresh polyurethane may be, for example, 2:1, 1:1 or 0.1:1.

EXAMPLE 4

In this example, there is used, for illustrative purposes, a sheet made of a microporous sheet having the structure illustrated in FIG. 1 but having a thickness considerably less than that of the preferred sheet materials. Similar results are obtained with thicker sheets.

The sheet is made from a polyesterurethane having a molecular weight of about 60,000 prepared following the procedure set forth in U.S. Patent 2,871,218, col. 4, lines 12 to 27. A mixture of 1447 g. (1.704 mols) of hydroxyl poly(tetramethylene adipate), molecular weight 849, hydroxyl number 130.4, acid number 0.89, and 109.6 g. (1.218 mols) of butanediol-1,4 is melted in a four liter kettle and stirred with a spiral ribbon stirrer for about 20 minutes at a pressure of 5 to 6 mm. at 100 to 110° C. To this mixture, there is added 730 g. (2.92 mols) of diphenyl methane-p,p' diisocyanate. This mixture is stirred for about 1 minute and is then poured into a lubricated one gallon can which is promptly sealed with a friction top and the can placed in a 140° C. oven for 3.5 hours. The product is then cooled. A 20% solution of the polyesterurethane in tetrahydrofuran is prepared.

Then 79.8 kg. of the solution is heated to 62° C. and maintained at 62–73° C. while 43.3 kg. of 1-hexanol is added slowly. The solution is clear. The solution is then slowly cooled over a 22 minute period until opalescence appears at 47° C. The opalescent composition is then cooled another 7 minutes to 43° C. and cast, over a period of 3 minutes, at a thickness of about 2.0 mm. onto the surface of a temporary support, such as a polyester/cotton woven percale sheet having a weight of 0.006 gram per square cm. The material is air-dried for a period of 6 hours at temperatures increasing up to 120° C. to remove the solvent and nonsolvent. After being cooled, the microporous polyurethane is then stripped from the polyester/cotton sheet.

The product is of "second quality" in terms of strength and other properties, probably because of insufficient control of the cooling and casting operations.

The resulting unreinforced sheet is then placed (horizontally on a metal plate) in a forced air oven in which dry hot air, maintained at a temperature of about 146° C. is blown across it at a velocity of about 200 feet per minute for 5 minutes. (Its collapse temperature is about 155° C.). The sheet shrinks lengthwise (in the "machine direction" hereafter designated "MD") about 18% and widthwise (in the "transverse direction" hereafter designated "TD") about 15%. Its thickness remains at about 0.6 mm.; as measured with a thickness gauge (ASTM D1813–64) whose results are affected slightly by differences in the resistance of the sheet materials to compression, the thickness after heat treatment is 0.61 mm. as compared to 0.58 mm. before heat treatment. The apparent density (obtained by weighing a rectangular piece, measuring its length, width and thickness and calculating its volume on the basis of those measured dimensions) is 0.479 grams per cm.$^3$ as compared to an original apparent density of 0.357 gram per cm.$^3$. The properties of the products are tabulated below:

|  | Before heat treatment | After heat treatment | ASTM test method |
|---|---|---|---|
| Tensile strength (kg. per cm.$^2$): |  |  |  |
| MD | 28.4 | 58.5 | }D882-67. |
| TD | 29.3 | 60.00 |  |
| Elongation at break (percent): |  |  |  |
| MD | 250 | 360 | }D882-67. |
| TD | 247 | 350 |  |
| Stress at 25% elongation (kg. per cm.$^2$): |  |  |  |
| MD | 1.03 | 1.15 | }D882-67. |
| TD | 1.00 | 1.25 |  |
| Area under stress-strain curve (kg.-cm.-per cm.$^2$): |  |  |  |
| MD | 2.89 | 7.54 | }D882-67. |
| TD | 2.99 | 7.54 |  |
| Slit tear strength (kg.): |  |  |  |
| MD | 0.45 | 1.25 | }D2212-64. |
| TD | 0.34 | 1.10 |  |
| Moisture vapor transmission (g./m.$^2$/24 hrs.) | 830 | 855 | E96-66 Procedure B. |
| Intrinsic viscosity of polyurethane [1] | 0.775 | 0.810 |  |

[1] Obtained by dissolving microporous product in dimethylformamide.

The heat-treated microporous product is soluble in tetrahydrofuran and any scrap of the heat-treated product may be recycled to the process, thus the scrap may be mixed with freshly produced polyurethane and the same solvent and then used to make more of the solution which is cast onto the temporary support, as described above. In such recycling the ratio of recycled polyurethane to fresh polyurethane may be, for example, 2:1, 1:1, or 0.1:1.

In a comparative run the heat treatment described above is carried out in the same way except that the layer of microporous polyurethane is not stripped from the temporary support. That is, the material placed in the oven is a composite of the polyurethane layer adhered, by impregnation of the fabric with the polyurethane during the casting operation, to the cotton fabric. The presence of the lower layer of cotton fabric prevents the lower portion of the polyurethane layer from shrinking and the material curls up on heat treatment.

EXAMPLE 5

A microporous polyester polyurethane sheet about 0.75 mm. in thickness and having a structure like that illustrated in FIG. 1 produced by the same general method as described in Example 4 and post dyed with Irgacet RL black (applied in methanol solution). The sheet, which has a density of about 0.4, is heated in an oven, as in Example 1 but at about 157° C. for 4 minutes; at the end of this period the microporous structure is found to be collapsed, the surface of the material being translucent or transparent. Another specimen of the same microporous material is heated under the same conditions but at a lower temperature, i.e. 143° C., for 4 minutes. The density of the material increases and its area decreases correspondingly as a result of this treatment. Its tear strength increases by 40% and it retains good moisture vapor transmission characteristics.

EXAMPLE 6

A pigmented microporous polyurethane sheet about 1.8 mm. in thickness and having an apparent density of 0.41 gram per cm.$^3$ (produced by the same general method as described in Example 1) is heated in a oven, as in Example 5 for 4 minutes. Two runs, each with a fresh sample, are made. In one run the air temperature in the oven is 146° C., in the other it is 157° C. The thickness of the material remains at about 1.8 mm. but its density increases, rising to about 0.44 gram per cm.$^3$ in the case of the sample treated at 146° C. The percent elongation at break is appreciably higher for the heat treated samples than for the original material.

EXAMPLE 7

A microporous polyurethane sheet is made according to the general method described in Example 3, using a proportion of the diisocyanate such that the temperature at which the microporous structure collapses when heated in a convection oven as in Example 3 for 10 minutes is about 191° C.

The sheet is then heated in a hot air oven, as in Example 3, for various times and temperatures, as shown in the following tabulation of the results:

| Heat treatment: |  |  |  |  |  |  |
|---|---|---|---|---|---|---|
| Temperature (° C.) | None | 163 | 180 | 180 | 180 | 185 |
| Time (min.) |  | 5 | 10 | 30 | 60 | 10 |
| Thickness (mm.) | 1.27 | 1.27 | 1.06 | 1.01 | 0.92 | 0.81 |
| Percent change: |  |  |  |  |  |  |
| MD |  | −6 | −8.2 | −9.1 | −9.5 | −11.8 |
| TD |  | 0 | −3.6 | −4.1 | −4.5 | −5.2 |
| Apparent density (g./cm.$^3$) | 0.44 | 0.46 | 0.55 | 0.57 | 0.57 | 0.74 |
| Water vapor transmission (g./m.$^2$/24 hrs.) | 730 | 720 | 720 | 750 | 680 | 620 |
| Slit tear strength (kg.) | 2.6 | 2.7 | 2.6 | 2.9 | 3.5 | 4.3 |
| Flex life at −12° C. (hrs.) | 4 | 6 | 8 | 12 | 12 | 4 |

The uneven shrinkage is believed to be due to undue tension exerted on the sheet during the manufacturing process (e.g. during leaching).

EXAMPLE 8

In this example the microporous sheet is produced by a process in which a solution of the polyurethane containing leachable particles is cast onto a temporary support, the solvent is evaporated and the leachable particles are removed by a leaching agent.

A solution of thermoplastic elastomeric polyurethane is prepared as follows: To 39.5 kg. of DMF in a 20 gal. reactor are added 8553 g. Desmophen 2001 polyester, 1767 g. 1,4-butanediol, 6.80 g. dibutyl tin dilaurate and 6683 g. diphenylmethane-p,p'-diisocyanate. The solution is stirred at 120° F. for 2½ hours, the unreacted isocyanate content determined by titration; then an amount of 1,4-butanediol to provide one alcoholic hydroxyl for each unreacted isocyanate group is added. The viscosity of the solution increases over a 3.4 hour period to 3600 poise (Brookfield), at which point 305 g. of a 50/50 methanol/DMF solution is added to stop the reaction. The final solution viscosity is 2400 poise, the final intrinsic viscosity is 1.00.

A 30% solution of the polyurethane in dimethylformamide is mixed with particles of sodium chloride (having an average particle size of 6 microns and a maximum particle size of 40 microns, as determined by microscopy)

in a two arm kneader mixer at room temperature for 1 hour (with air excluded) and then given one pass through a three roll mill (set with the rolls spaced so as not to crack the salt particles) to improve the evenness of distribution of the salt in the mixture. The milled mixture is then degassed under vacuum (at a pressure of 4 mm. Hg absolute) for 30 minutes at room temperature.

The degassed mixture is spread onto a water-permeable temporary support (a sheet of "Porex" porous polyethylene) and immediately placed in a hot air circulating oven to evaporate off the solvent slowly (e.g. at an oven temperature of 38% C. for 10 hours), after which it is immersed in a bath of water to leach out the salt (e.g. at 57° C. for 9½ hours) and then dried in a convection oven (e.g. at 43° C. for 1½ hours). It is then stripped from its temporary support.

The same procedure is carried out with two different salt:polymer ratios: 3.8:1 which gives a less dense sheet, and 1.8:1 which gives a more dense sheet. Samples of each of the sheets (whose collapse temperatures are 179° C.) are then heat treated under different conditions, with the results tabulated below:

|  | Salt:polymer ratio | | | | | |
| --- | --- | --- | --- | --- | --- | --- |
|  | 1.8:1 | | | 3.8:1 | | |
|  | (a) | (b) | (c) | (d) | (e) | (f) |
| Heat treatment: | | | | | | |
| Temperature (° C.) | None | 168 | 174 | None | 165 | 174 |
| Time (mins.) | | 60 | 10 | | 5 | 10 |
| Thickness (mm.) | 1.34 | 1.14 | 0.99 | 1.9 | 1.9 | 1.35 |
| Apparent density (g./cm.³) | 0.49 | 0.63 | 0.74 | 0.27 | 0.33 | 0.60 |
| Slit tear strength (kg.) | 2.6 | 3.9 | 6.0 | 1.14 | | 2.27 |

Other measurements on the above heat-treated sample $e$ (as compared to the same measurements on the untreated sample $d$) show that its tensile strength and its ultimate elongation are each some 170% of their values before heat treatment; its modulus at 25% elongation is some 130% of the value before heat treatment; the area under its stress-strain curve (which is an indication of the work needed to break the material, in tension) is some 320% of the value before heat treatment.

EXAMPLE 9

Another suitable polyurethane, which may be employed in place of the polyurethane described in the preceding examples, may be prepared by using polycaprolactone ("Niax D560") of 2029 average molecular weight in place of the glycol adipate. The polycaprolactone has alcoholic hydroxyl groups at both ends, having been made by initiating the polymerization of the epsiloncaprolactone in the presence of butanediol-1,4; its acid number is 1 or less.

The temporary support used in the above examples is, typically, a sheet of porous synthetic plastics material formed by spreading an even layer of Ziegler high density polyethylene powder on a smooth metal surface and then placing the smooth metal surface and the layer in a suitable heated oven to cause the particles to sinter. The surface of the resultant sintered sheet which was in contact with the smooth metal surface is smoother than the other face and it is on this smoother face that the layer is formed. A typical temporary support is 0.067"±0.004" thick and has a permeability of 18±4 cubic ft. air/minute at a gram/ft.².

In all the above examples the product is removed from the heat treatment oven, placed flat on a metal table top, and allowed to cool in the atmosphere at room temperature (e.g. 25° C.). In continuous operations the sheet leaving the oven may be cooled quickly, as by blowing room temperature air against it. In the above examples no external mechanical force is applied to the sheets during their heat treatment or cooling.

With respect to the structure of the preferred type of microporous material, it appears from the photomicrographs (FIGS. 2-4) that the volume of the sheet is largely taken up by cavities of generally rounded or compact (not highly elongated) shape, whose maximum dimensions are in the range of about 10 to 45 microns, connected by smaller passageways. It will be appreciated that in any cross-sectional slice some cavities will be cut along a diametral plane (so that their full diameters will be apparent) while others will be cut on one side or the other of a diametral plane (so that the apparent diameter of such cavities on the photograph may be considerably less than their actual diameters).

The preferred thermoplastic elastomeric polyurethanes are understood to have few, if any, chemical cross links and are believed to derive their properties primarily from hydrogen bending forces rather than cross linkages. Their stress-strain curves are of the same general shape as those shown in FIG. 1 of the article by Stetz and Smith in Rubber Age, May 1965, page 74. While the polyurethane itself usually shows a tension set below 100%, as previously discussed, the preferred microporous polyurethane sheets generally recover completely with substantially no permanent set (under standard dry conditions at room temperature) after being stretched 100%.

All measurements referred to herein are made at room temperature (e.g. 23° C.) unless the test method specifies otherwise.

The water vapor transmission of a top grade men's weight black calf chrome leather (from A. C. Lawrence Tannery), measured by the same method as used in the examples herein, is 680 g./m.²/24 hours.

While the examples hereinabove carried out in air, similar results are obtainable when the invention is carried in nitrogen atmosphere.

It is understood that the foregoing detailed description is given merely by way of illustration and that variations may be made therein without departing from the spirit of the invention. The "Abstract" given above is merely for the convenience of technical searchers and is not to be given any weight with respect to the scope of the invention.

I claim:

1. In a process for the treatment of a microporous sheet consisting essentially of non-fibrous thermoplastic elastomeric polyurethane material and having a thickness in the range of about 0.63 to 2.5 mm., and having a surface layer of fused polyurethane, the improvement which comprises heating said sheet at a temperature below the collapse temperature of said sheet and within 40° C. of said collapse temperature to cause said sheet to shrink about 5 to 40% in area, the density of the sheet before said heating being about 0.2 to 0.5 gram per cubic centimeter, said sheet before said heating having a percent elongation at break of above 50%, a water vapor transmission of at least 200 grams per square meter per 24 hours, and a tensile strength of at least 5 kilograms per square centimeter.

2. Process as in claim 1 in which the heating is effected by subjecting said sheet, without external compression, to hot air while said sheet is supported horizontally on a support which permits said shrinkage during heating.

3. Process as in claim 2 in which the time of heating is sufficiently short in relation to the temperature that substantially no reduction in the thickness of the sheet occurs during the heating.

4. Process as in claim 3 in which said surface layer of fused polyurethane is about 2 to 15 microns in thickness, and the time of heating is about 3 to 5 minutes.

5. Process for the production of a finished microporous sheet which comprises (I) providing a microporous sheet consisting essentially of non-fibrous thermoplastic polyurethane material having a thickness in the range of about 0.63 to 2.5 mm., having a percent elongation at break of above 70%, a water vapor transmission of at least 200 grams per square centimeter per 24 hours, and a tensile strength of at least 5 kilograms per square centimeter, a density of about 0.25 to 0.45 gram per cubic centimeter and having compact cavities about 10 to 45 microns in maximum dimension connected by passages of smaller diameter, said polyurethane being soluble in dimethyl formamide, having an intrinsic viscosity of above 0.8 and a percent elongation at break of at least 300% and being a chain-extended reaction product of (a) a soft polyester in which the

groups are separated by aliphatic chains averaging about 3 to 6 carbon atoms in length, said polyester having a molecular weight within the range of 800 to 6000 and (b) diphenylmethane-p,p'-diisocyanate, said polyurethane having a nitrogen content of 4 to 5%, (II) applying, to the upper surface of said microporous sheet, fine particles of dimethyl formamide and heating said upper surface with hot air to fuse the solvent rich polyurethane at the surface and evaporate the solvent, to thereby collapse the microporous structure of said upper surface and form a thin fused polyurethane skin thereon, and then (III) heating said sheet at a temperature below the collapse temperature of said sheet and within 40° C. of said collapse temperature, to cause said sheet to shrink about 5 to 40% in area while said sheet is supported horizontally on a support which permits said shrinkage in area, the time of heating being sufficiently short that substantially no reduction in the thickness of the sheet occurs during the heating, said polyurethane remaining thermoplastic and soluble in dimethylformamide after said heating.

6. Process as in claim 5 in which said surface layer of fused polyurethane is about 2 to 15 microns in thickness.

References Cited
UNITED STATES PATENTS

| | | | |
|---|---|---|---|
| 3,100,721 | 8/1963 | Holden | 264—41 |
| 3,214,290 | 10/1965 | Larner et al. | 260—77.5MP |
| 3,387,989 | 6/1968 | West et al. | 260—77.5MP |

ROBERT F. WHITE, Primary Examiner

G. AUVILLE, Assistant Examiner

U.S. Cl. X.R.

260—2.5; 264—342